INVENTOR
PAUL GEYER
BY Jack Rosin
ATTORNEY

INVENTOR
PAUL GEYER
BY Jack Boari
ATTORNEY

Feb. 7, 1967   P. GEYER   3,302,502
METHOD AND APPARATUS FOR DICING MATERIAL
Filed Oct. 22, 1964   9 Sheets-Sheet 4
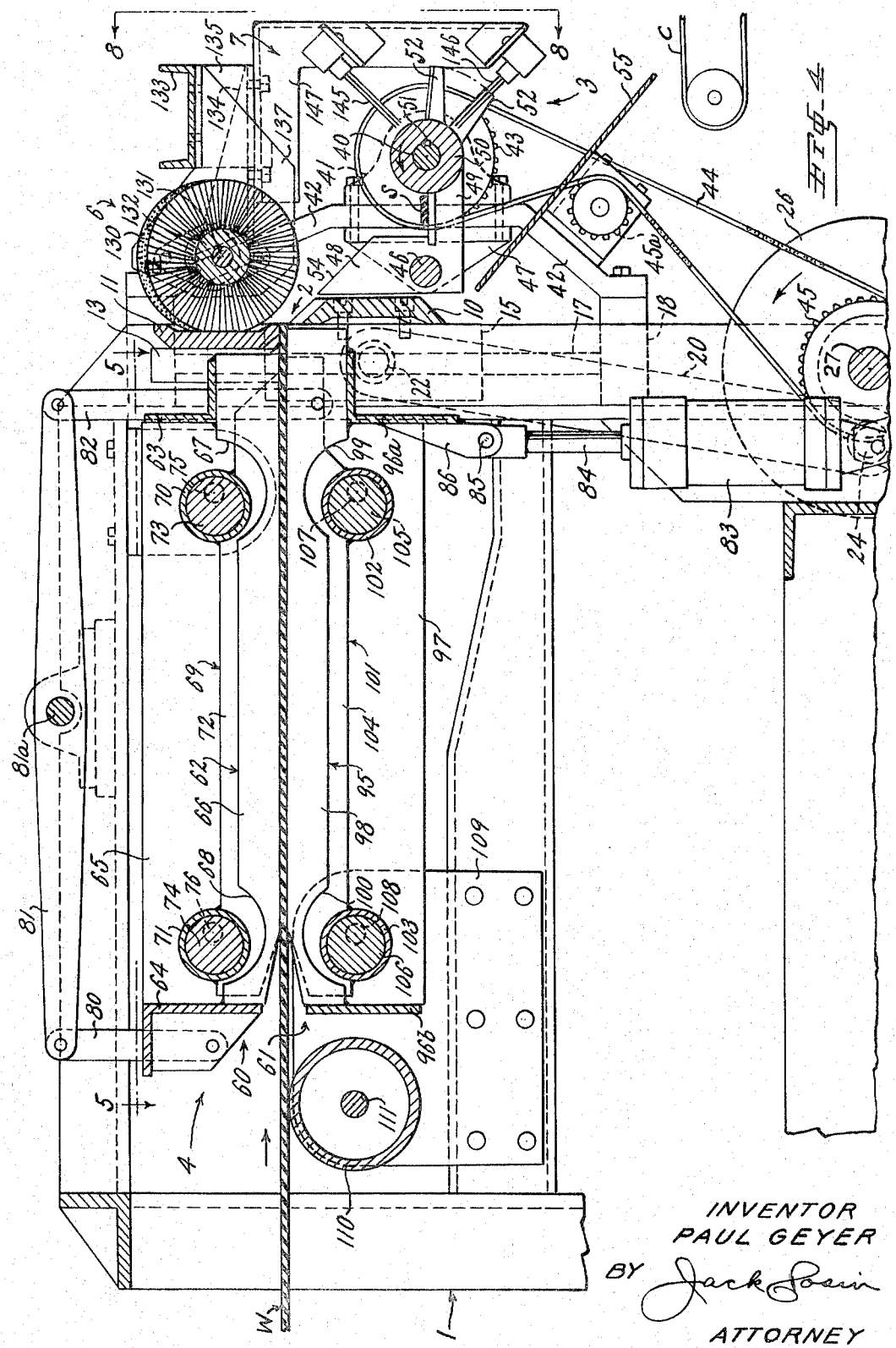
INVENTOR
PAUL GEYER
BY Jack Sosin
ATTORNEY

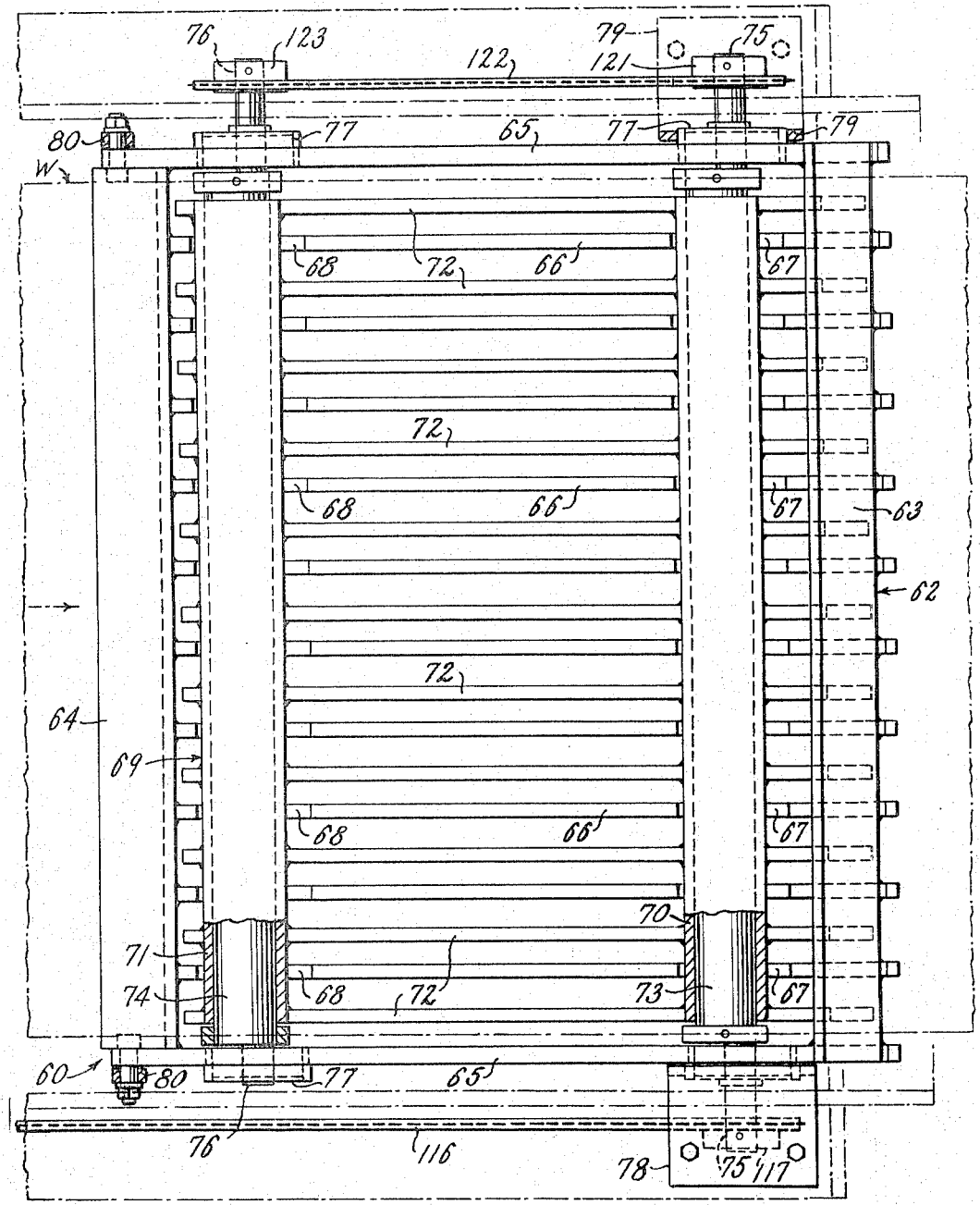

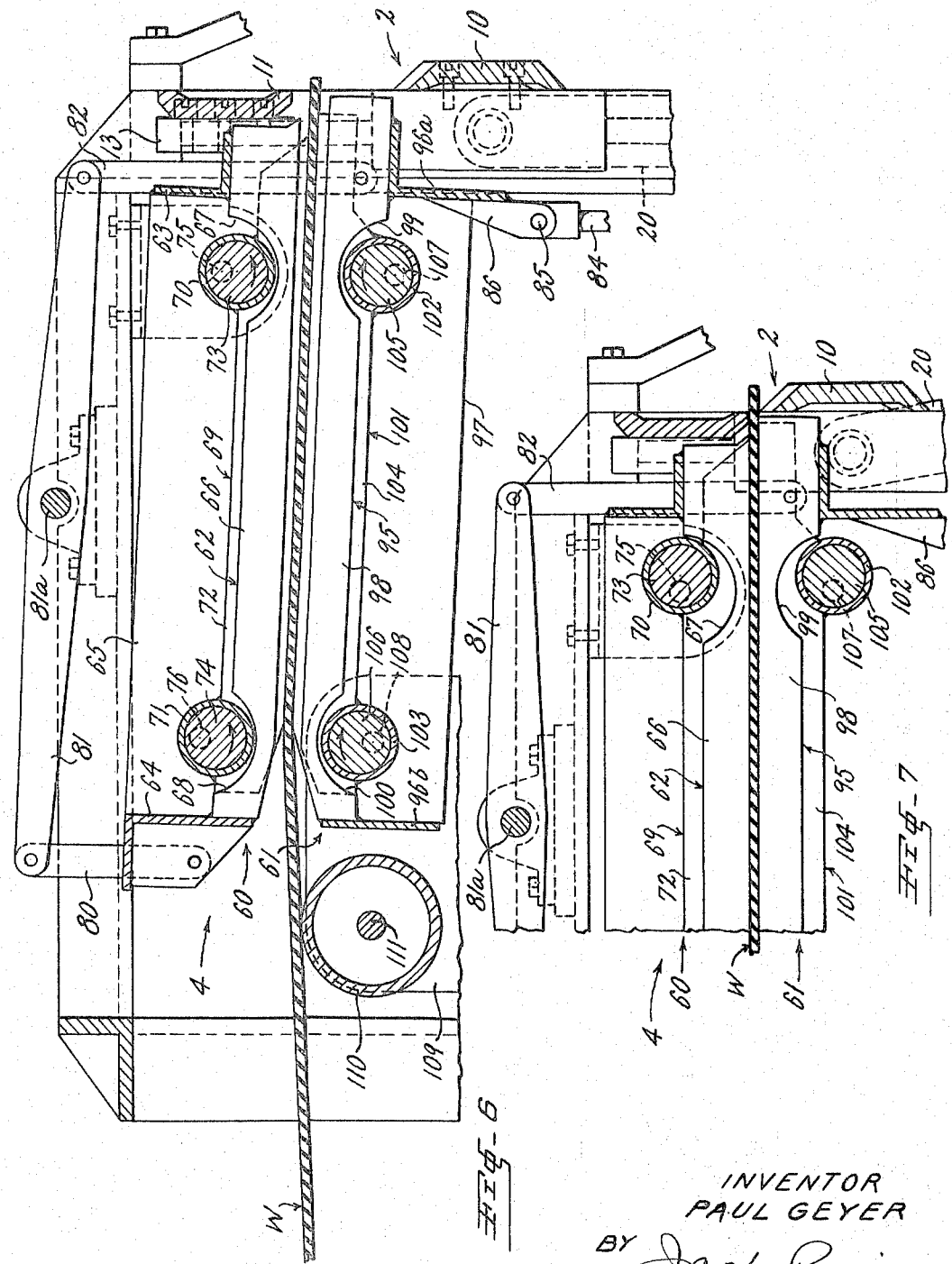

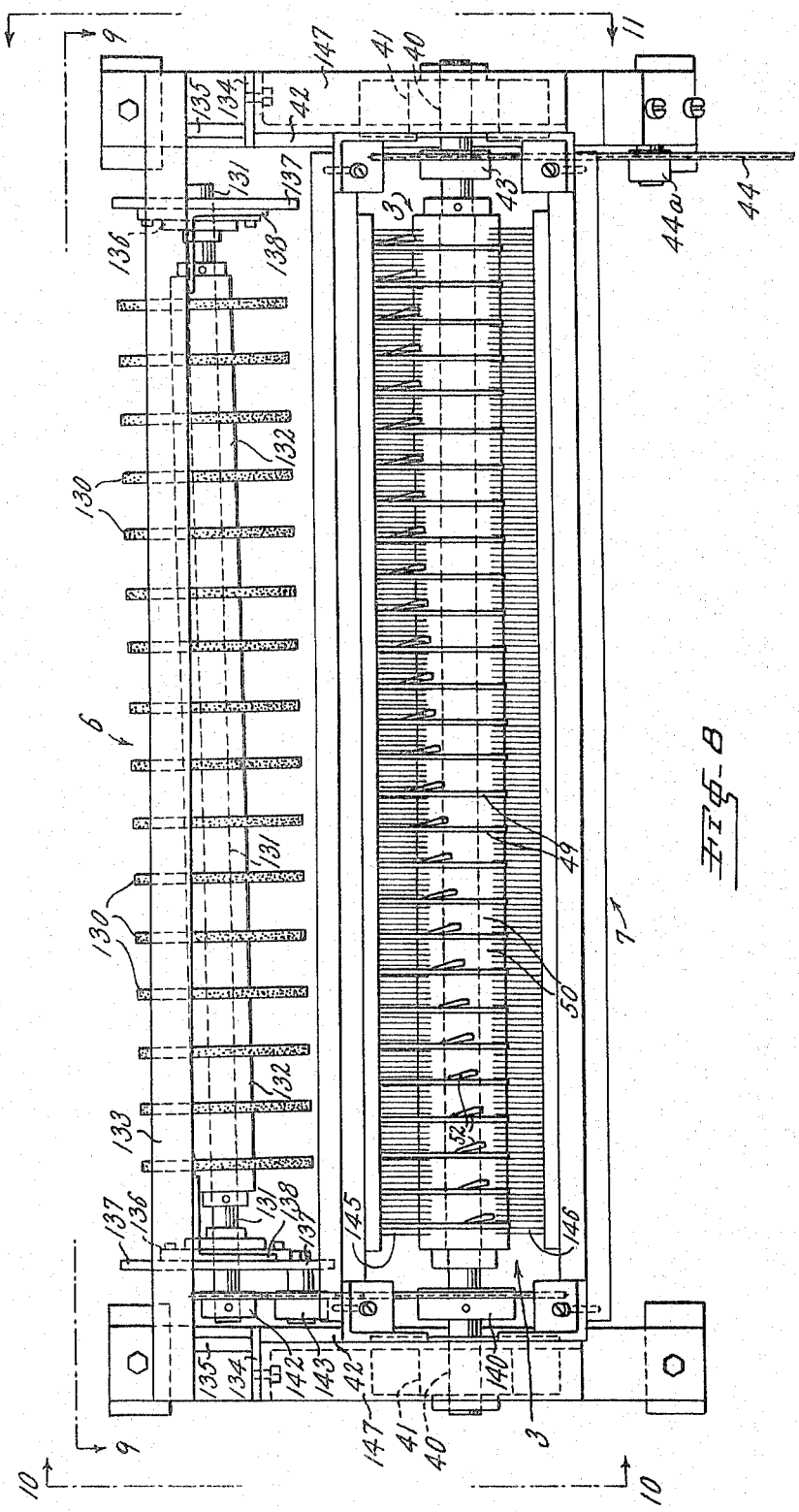

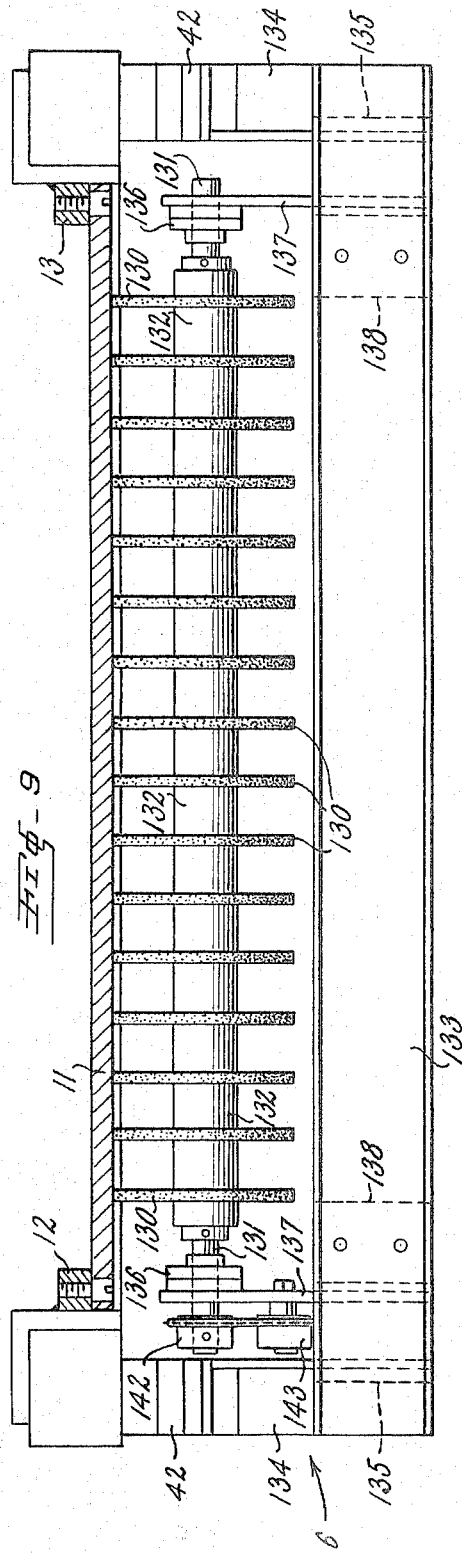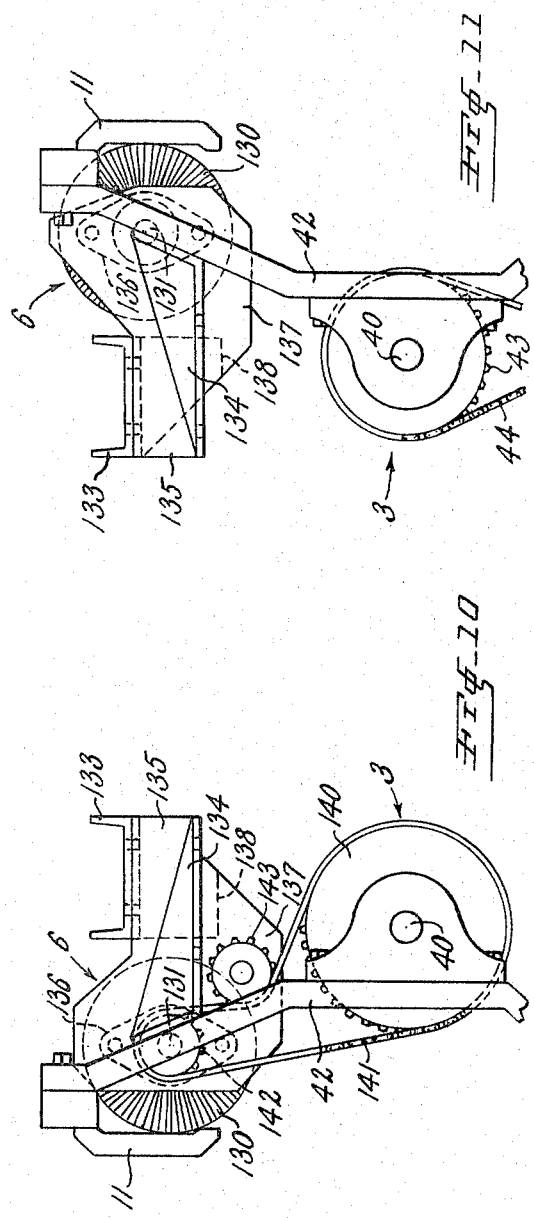

Feb. 7, 1967 P. GEYER 3,302,502
METHOD AND APPARATUS FOR DICING MATERIAL
Filed Oct. 22, 1964 9 Sheets-Sheet 9

INVENTOR
PAUL GEYER
BY Jack Goorin
ATTORNEY

United States Patent Office 3,302,502
Patented Feb. 7, 1967

3,302,502
METHOD AND APPARATUS FOR DICING MATERIAL
Paul Geyer, Detroit, Mich., assignor to United States Rubber Company, New York, N.Y., a corporation of New Jersey
Filed Oct. 22, 1964, Ser. No. 405,750
6 Claims. (Cl. 83—44)

This invention relates to dicers and, more particularly, to machines and methods for dicing plastic, tacky materials.

The terms "dicer" and "dicing" have reference to the cutting of a relatively large web of material into uniform, relatively small, pieces. The term "dice" as used herein has reference to the small uniform pieces into which the web is cut, irrespective of the actual configuration of the pieces.

In the processing of plastic, tacky material such as, for example, unvulcanized rubber, it is often necessary to cut a moving web of material into uniform dice and then feed the dice at a predetermined rate into downstream apparatus such as, for example, mixers, extruders, tubers, injection molding machines, and the like. In order to diminish rejects for variations or blemishes in the output of such downstream apparatus, it is desirable that highly uniform dice be provided to the apparatus in an uninterrupted flow. Such high uniformity is often difficult to achieve in prior art dicing machines and methods due to the use therein of feed conveyors or belts which do not provide for positive control of the web immediately adjacent to the various cutting elements of the dicer. Moreover, the tacky nature of the material being diced often contributes to non-uniformity due to occasional adherence of the dice to the cutters and consequent fouling of the cutters. Another factor giving rise to non-uniformity in certain prior art machines is the use of cutting mechanisms which wear prematurely due to being subjected to excessive shock during each cutting stroke.

In order to overcome many of the foregoing disadvantages it has been found desirable, in accordance with the present invention, to provide a dicing machine and method in which positive control is maintained over the web as it advances into the cutter elements, the cutter elements are brushed clean after each cutting stroke, and the cutting mechanisms are arranged to provide a minimum of shock during operation. This insures that highly uniform dice are made by the machine and method of the present invention.

Accordingly, one object of this invention is the provision of an improved machine for dicing plastic, tacky sheet materials.

Another object of this invention is the provision of an improved method of dicing plastic, tacky sheet materials.

A further object of this invention is the employment of improved positive control of a web of tacky sheet material in its progression through the cutting elements of a dicing system.

An additional object of this invention is the utilization of brushes to disengage the tacky material from the cutting elements in a dicing system.

Still another object of this invention is the provision of improved cutters in a dicing machine.

Further objects and advantages of this invention will become apparent as the following description proceeds.

Briefly stated, and in accordance with one embodiment of this invention, there is provided a machine for cutting a web of sheet material into a plurality of small pieces, comprising slicing means positioned transversely in the machine and operable during successive slicing strokes to sever the web transversely into elongated strips; indexing and clamping means positioned upstream of the slicing means for alternately advancing the web to the slicing means between the slicing strokes and for clamping the web during the slicing strokes; and rotary cutting means positioned transversely in the machine and downstream of the slicing means and provided with a plurality of axially spaced blades for severing each of the elongated strips into a plurality of small pieces.

The method of cutting the web of sheet material into a plurality of small pieces, in accordance with this invention, comprises transversely and repeatedly slicing the web to form elongated, narrow strips of the material; and cutting each of the strips at a plurality of points along its length to form the plurality of small pieces, the plurality of cuts in each individual strip being progressively made during a common cutting stroke.

While the specification concludes with claims particularly pointing out and distinctly claiming the subject matter of this invention, it is believed that the invention will be better understood from the following description, taken in conjunction with the accompanying drawings, in which:

FIG. 4 is an enlarged sectional elevational view, taken along the line 4—4 of FIG. 3.

FIG. 5 is a sectional plan view, taken along the line 5—5 of FIG. 4, with parts cut away for clarity;

FIG. 6 is a fragmentary sectional elevational view, similar to FIG. 4, with various details omitted for clarity, showing the apparatus in a different condition of operation;

FIG. 7 is a fragmentary sectional elevational view similar to FIGS. 4 and 6, showing the machine in yet another condition of operation;

FIG. 8 is an end elevational view, taken along the line 8—8 of FIG. 4, showing brush means employed in stripping plastic tacky material from the slicing means and the cutting means of the machine;

FIG. 9 is a plan view of the brush means, taken along the line 9—9 of FIG. 8;

FIG. 10 is a side elevational view, taken along the line 10—10 of FIG. 8;

FIG. 11 is a side elevational view, taken along the line 11—11 of FIG. 8;

GENERAL DESCRIPTION

Figure 1:
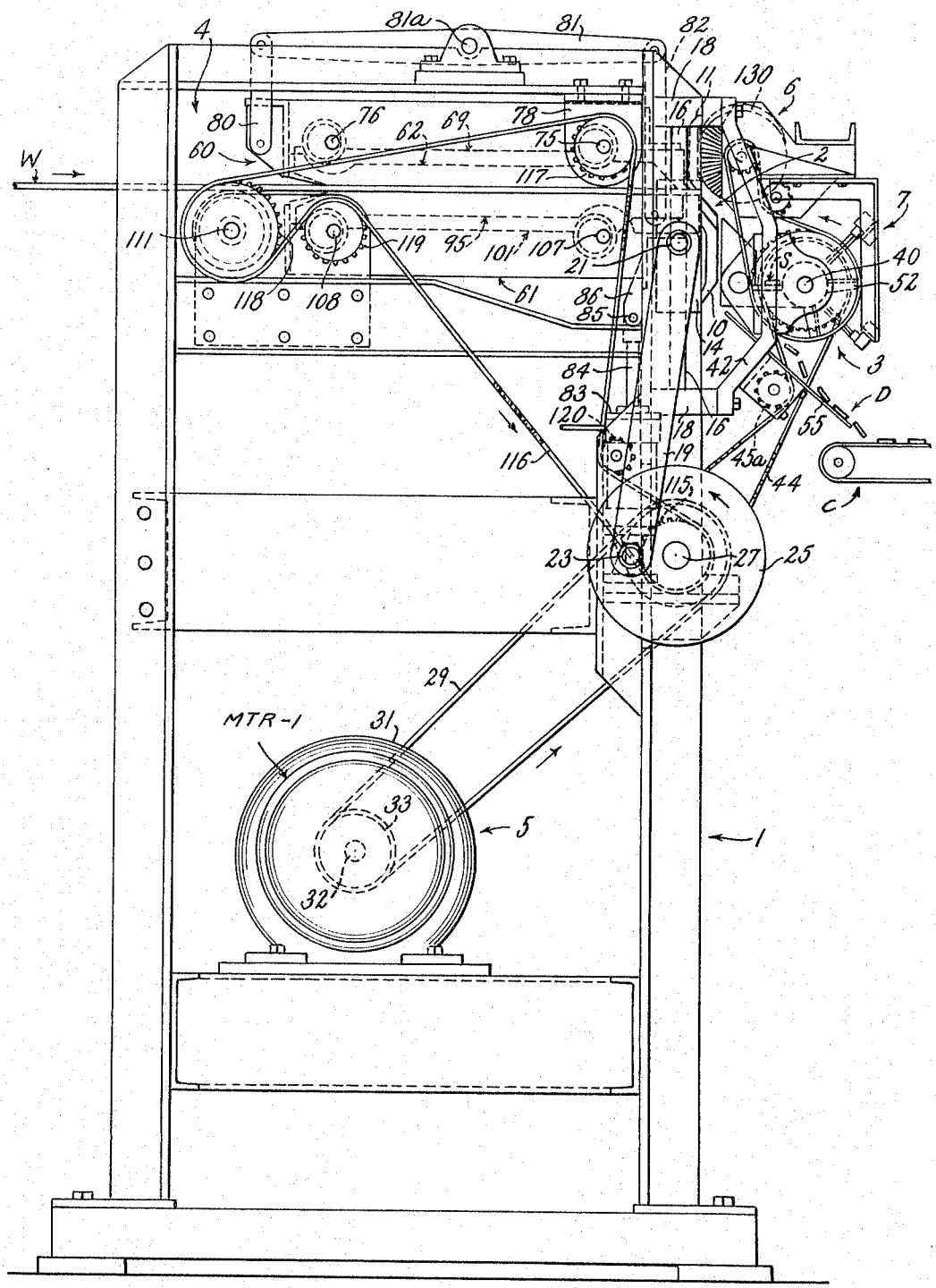
FIG. 1 is a side elevational view of a preferred form of dicing machine.

Referring now to FIG. 1, there has been illustrated a dicing machine made in accordance with this invention. A web W of tacky sheet material is fed into the dicer from the left, or upstream, end of the machine and rectangular dice D are discharged from the right or downstream end of the machine.

The machine comprises a frame, shown generally at 1, which supports a slicing means, shown generally at 2, transversely of the path of movement of the web W through the machine. Slicing means 2 is vertically reciprocated to shear off a strip S of material from the web W during each cycle of the machine. Each strip S drops down onto the anvil members of a cutting or dicing means, shown generally at 3 which, employs a plurality of blades to cut the strip into dice D.

Indexing and clamping means, shown generally at 4, are positioned upstream of slicing means 2 and are employed in feeding the web W to the slicing means 2 and clamping the web W during the slicing stroke of the slicing means 2. Each of the foregoing elements 2, 3 and 4 operate once during each cycle of the machine to progressively feed the web W to the slicing means 2, slice the web W into strips S, and cut the strips S into dice D. A drive means, shown generally at 5, employed in cycling the various components 2 through 4.

A rotary brush means, shown generally at 6, is coextensive with and engages the blade of slicing means 2 during its slicing stroke to insure that the tacky strip S is disengaged from the blade at the completion of the slicing stroke. Similarly, a second brush means, shown generally at 7, is positioned to be engaged by the cutting elements of cutting means 3 to insure that the tacky dice are disengaged from these cutting elements upon completion of the cutting stroke.

THE SLICING MEANS 2

Figure 3:
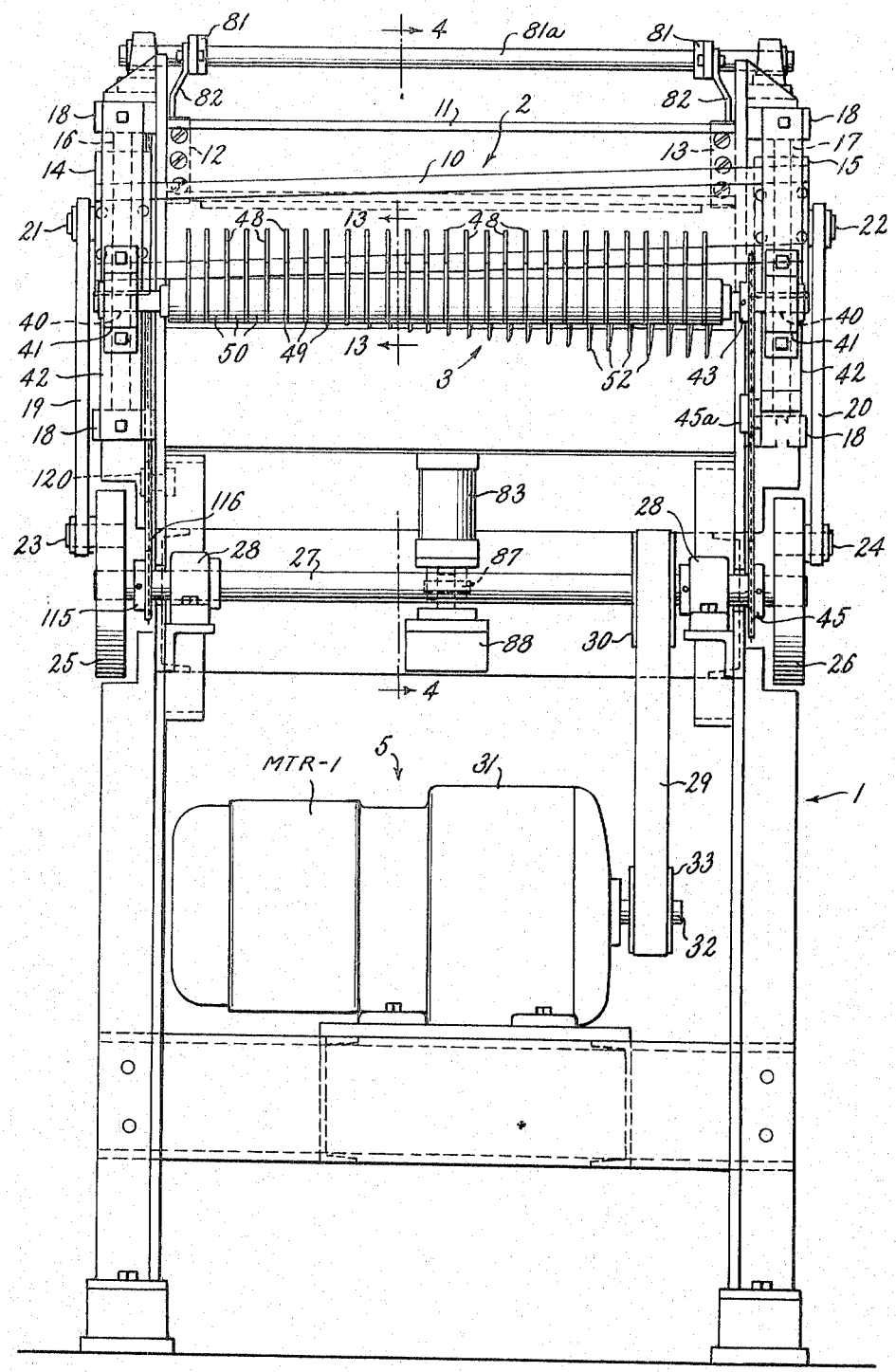
FIG. 3 is a front elevation of the dicing machine of FIG. 1, but having various details omitted for clarity.

Referring to FIGS. 1 and 3, which show the slicing means 2 in two different positions of operation, the slicing means 2 comprises a transversely extending, vertically reciprocable slicing member or blade 10 which cooperates with a stationary anvil 11 in slicing strips S from the web W. Blade 10 is tilted at a slight angle to the horizontal and anvil 11 is horizontal so that during the vertical stroke of blade 10 a smooth cutting action takes place to shear the strip S from the web W. The anvil 11 is rigidly connected to frame 1 by being bolted at each of its ends to respective blocks 12 and 13, the blocks 12 and 13, in turn, being welded to the vertical legs of frame 1. Slicing member 10, on the other hand, is bolted at each of its ends to movable crosshead members 14 and 15, respectively, which are vertically reciprocable upon rods 16 and 17, respectively. Rods 16 and 17 are carried in blocks 18 which are welded to the vertical legs of frame 1.

The crosshead members 14 and 15 are vertically reciprocated, carrying the slicing member 10 along with them, by means of connecting links 19 and 20, respectively. The connecting links 19 and 20 are pivoted at their upper ends 21 and 22, respectively, to the crosshead members 14 and 15, and the lower ends of connecting rods 19 and 20 are pivoted at 23 and 24, respectively, to fly wheelcrank members 25 and 26, respectively. Cranks 25 and 26, in turn, are carried at opposite ends of a drive shaft 27 which is journaled in frame 1 by means of journals 28. Drive shaft 27 is rotated via a belt 29 and pulley 30, the pulley 30 being keyed to drive shaft 27.

Driving means 5 comprises a motor MTR–1 and a manually adjustable variable speed mechanism 31 which can provide output speeds of, for example, 100 through 1700 r.p.m. The rotary output of mechanism 31 is applied to belt 29 by means of a shaft 32 and pulley 33.

Motor MTR–1 and variable speed mechanism 31 may be of the type made by the Dynamatic Division of Eaton Manufacturing Company of Kenosha, Wisconsin, model ACM–256–906, Ajusto-spede, rated 10 horsepower at 1700 r.p.m., speed range 1700/100 r.p.m.

From the foregoing, it will be seen that with each revolution of drive shaft 27, blade 10 cycles from a lower position, through its cutting stroke to an upper position, and back down to its lower position.

CUTTING MEANS 3

Figure 2:
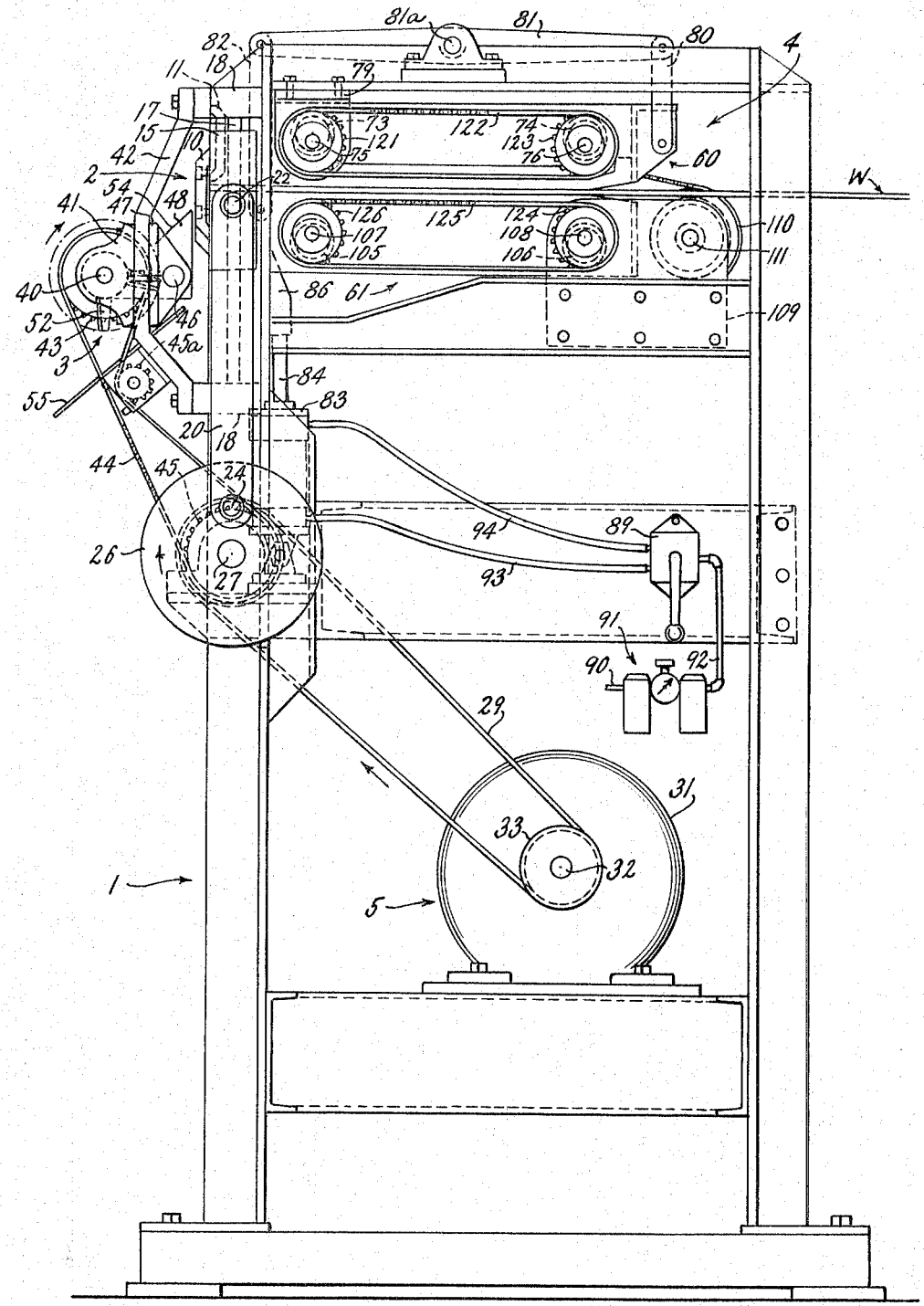
FIG. 2 is another side elevational view of the dicing machine shown in FIG. 1, but taken from the opposite side thereof and having various details omitted for greater clarity.

The cutting means 3 has been illustrated most clearly in FIGS. 2, 3, 4, 8 and 12 through 14. Referring to FIGS. 2 and 3, cutting means 3 includes a shaft 40 which is rotationally supported at its ends in journals 41. The journals 41 are carried on brackets 42 fixed to the vertical legs of frame 1. A sprocket 43 is keyed to shaft 40 adjacent one of its ends. Sprocket 43 is driven by a chain 44 and a drive sprocket 45 which is keyed to drive shaft 27. An idler sprocket 45a is employed to tension chain 44. Thus, rotation of drive shaft 27 by drive means 5, in addition to reciprocating slicing means 2, also rotates cutting means 3.

Figure 12:
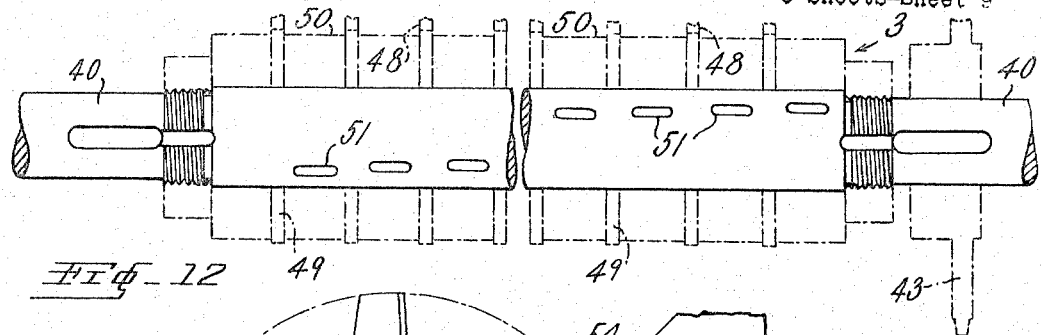
FIG. 12 is a fragmentary view of the support shaft of the rotary cutting elements employed in the machine of FIG. 1.
Figure 13:
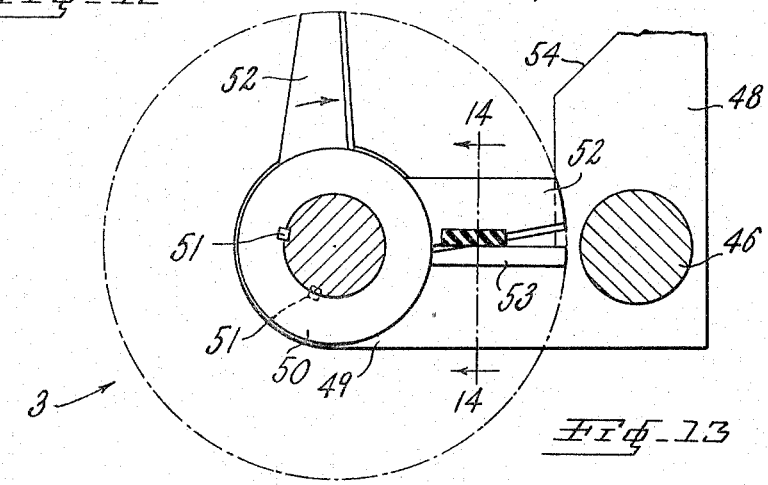
FIG. 13 is an enlarged sectional elevational view of the rotary cutting means, taken along the line 13—13 of FIG. 3; and, FIG. 14 is a sectional elevational view of the rotary cutting means taken along the line 14—14 of FIG. 13.
Figure 14:
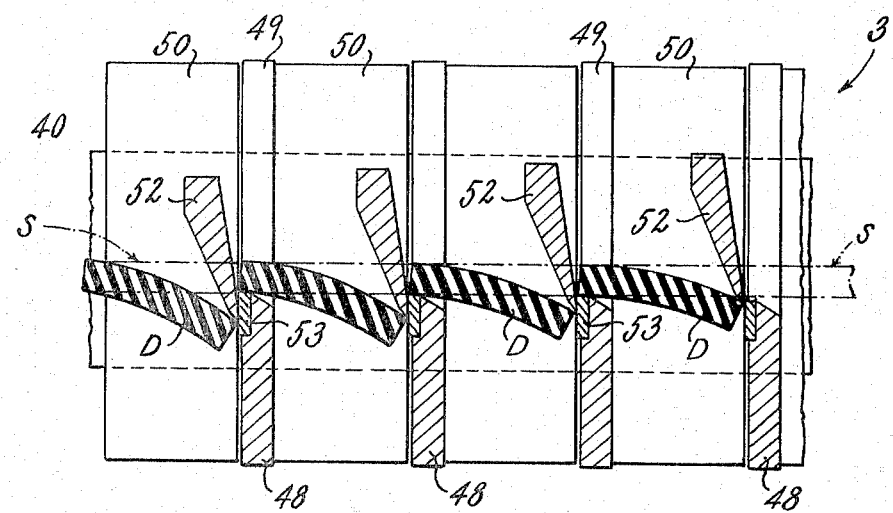

A support rod 46 (FIGS. 4 and 13), having its ends clamped to mounting pads 47 that are bolted to brackets 42, is employed in supporting one end each of a series of anvil members 48 (see FIG. 3). Referring to FIGS. 12 and 13, the anvil members 48 are each provided with a second end portion 49 which encircles and is supported on shaft 40, the various end portions 49 being spaced apart along shaft 40 by spacing elements or collars 50 which are keyed to shaft 40 by keys 51.

Each of spacing elements 50 has fixed thereto a radially extending blade 52 which moves about shaft 40 during rotation of the latter. The blades 52 are circumferentially displaced from one another about shaft 40 by slight increments, and are hardened and sharpened to perform their cutting function. Hardened inserts 53 (FIGS. 13 and 14) are brazed to the anvil members 48 at points intermediate shaft 40 and rod 46. Blades 52 and inserts 53 cooperate in cutting the strip S into rectangular dice D during each revolution of shaft 40.

As may be best seen in FIG. 4, each of the anvil members 48 includes a slanted upper surface 54 which terminates closely adjacent to the blade 10 of slicing means 2. Surfaces 54 serve as a ramp or guide way to conduct strips S cut from web W down to a cutting position on the inserts 53. Considering FIG. 14 along with FIG. 4, it will be apparent that, during the cutting stroke of the blades 52 of cutting means 3, the various dice D are pushed downwardly by the blades, between the anvil members 48, and are discharged via a collector plate 55 onto conveyor C.

Referring to FIG. 13, it will be seen that blades 52 and inserts 53 cooperate in scissor-like actions to provide smooth, shockless, cutting strokes. Since the blades 52 are circumferentially spaced about shaft 40, only a few of the blades are in the process of cutting through strip S at any given instant. This feature also operates to provide a smooth cutting action. Further, since during the cutting stroke more than one blade 52 is in the process of cutting through strip S, the strip is effectively clamped in place by the blades, insuring uniformity of the dice being cut.

INDEXING AND CLAMPING MEANS 4

The indexing and clamping means 4 has been illustrated generally in FIGS. 1 through 3, and in greater detail in FIGS. 4 through 7. Referring to FIG. 4, the indexing and clamping means 4 comprises essentially similar, opposed, upper and lower platform assemblies 60, and 61, respectively, each of which is pivotally mounted at one of its ends to the frame 1 of the machine and vertically movable at the other of its ends to allow separation of the platforms in connection with initial loading of the machine and during operation of the machine.

Referring to FIG. 5 along with FIG. 4, upper platform 60 includes a clamping means 62 for clamping the web W adjacent to slicing means 2 during the slicing stroke of slicing member 10. Clamping means 62 comprises forward and rear angle members 63 and 64, respectively, which are interconnected at their ends by means of side plates 65. A plurality of clamping plates 66 are welded to and extend longitudinally between forward and rear members 62 and 63 at transversely spaced intervals. Each of clamping plates 66 is provided with arcuately cut-out portions adjacent its forward and rear ends at 67 and 68, respectivley, the cut-out portions 67 and 68 providing clearance for movement of an indexing means 69 which serves to advance the leading edge of web W past slicing means 2 between slicing strokes of slicing member 10.

Indexing means 69 comprises sleeves 70 and 71 which are rigidly interconnected by a group of indexing plates 72. Indexing plates 72 extend longitudinally between the sleeves 70 and 71 and are welded thereto. The indexing plates 72 are transversely spaced in the platform assembly 60 and alternate in transverse location with the clamping plates 66. A forward eccentric cam 73 and a rear eccentric cam 74 are carried on respective shafts 75 and 76 and rotate within the sleeves 70 and 71, respectively, to cycle the indexing and clamping means 4. Shafts 75 and 76 are journaled in side plates 65 by means of journals 77.

Referring to FIGS. 1, 2 and 5, mounting blocks 78 and 79 depend from the upper portion of frame 1 in register with shaft 75 and pivotally support the downstream end of upper platform assembly 60 relative to frame 1. The upstream end of upper platform assembly 60 may be raised and lowered via a rocker assembly including links 80, rocker arms 81 (see, also, FIG. 3), a shaft 81a, and links 82, the latter being pivotally connected to the downstream end of lower platform assembly 61 (see FIG. 4).

The downstream end of lower platform assembly 61, in turn, is raised and lowered via a pneumatic power cylinder 83 which extends and retracts piston rod 84. The outer end of piston rod 84 is pivotally connected at 85 to a clevis 86 that is welded to the downstream end of lower platform assembly 61. The lower end of cylinder 83 is pivoted at 87 (FIG. 3) to a bracket 88 carried on frame 1 of the machine. As will appear in greater detail hereinafter, the upstream end of lower platform assembly 61 is pivotally mounted relative to frame 1 in a manner similar to that of the downstream end of upper platform assembly 60, so that upon retraction of piston rod 84 into cylinder 83, the space between the opposed platform assemblies 60 and 61 increases appreciably to facilitate loading a new web W of fabric into the machine. Upon extension of piston rod 84 out of power cylinder 83, platform assemblies 60 and 61 return to the position shown in the drawings. Biasing air pressure, tending to extend piston rod 84, is maintained during operation of the machine. This biases the platform assemblies 60 and 61 toward one another for continuous operation of the machine.

Referring to FIG. 2, the delivery of air under pressure to the upper, piston retracting, and lower, piston extending, ends of power cylinder 83, and the exhaust of air therefrom, is controlled by a four-way valve 89. High pressure air from a suitable source (not shown) reaches valve 89 via a conduit 90, a filter-pressure regulator-lubricator assembly, shown generally at 91, and a conduit 92. A conduit 93 interconnects valve 89 with the lower end of power cylinder 83 and a conduit 94 interconnects valve 89 with the upper end of power cylinder 83. Actuation of valve 89 in one direction causes the lower end of cylinder 83 to be pressurized and the upper end of the cylinder to be exhausted to atmosphere. Actuation of valve 89 in the other direction causes an opposite reaction wherein the upper end of cylinder 83 is pressurized and the lower end is exhausted to atmosphere.

Referring to FIG. 4, lower platform assembly 61 is essentially similar to upper platform assembly 60. It includes a clamping means 95 which cooperates with the upper clamping means 62 in clamping web W adjacent to slicing means 2 during the slicing stroke of slicing member 10. Clamping means 95 comprises forward and rear angle members 96a and 96b, respectively, two side plates, one of which is shown at 97, and a plurality of clamping plates 98 having cut-out portions 99 and 100. Lower platform assembly 61 further includes an indexing means 101 which cooperates with the upper indexing means 69 in advancing the leading edge web W past slicing means 2 between slicing strokes of slicing member 10. Indexing means 101 comprises a forward sleeve 102, a rear sleeve 103, a plurality of indexing plates 104, a forward eccentric cam 105, and a rear eccentric cam 106, the forward eccentric cam 105 being mounted on a forward shaft 107 and the rear eccentric cam 106 being mounted on a rear shaft 108.

As in the case of journals 77 (FIG. 5) in the upper platform assembly 60, the lower platform assembly 61 is provided with journals (not shown) carried by the side plates 97 (FIG. 4) to rotatably support the shafts 107 and 108. Further, transversely spaced mounting blocks, one of which is shown at 109, pivotally support the upstream end of lower platform assembly 61 relative to frame 1 of the machine, as hereinbefore mentioned. Mounting blocks 109 also serve as supports for a guide roller 110 carried on a shaft 111 journaled therein. Roller 110 serves to guide the web W into the indexing and clamping means 4.

Referring to FIGS. 1 and 3, the various shafts 75, 76, 107 and 108 of platform assemblies 60 and 61 are driven in the following manner. Drive shaft 27, which is rotated by drive means 5, carries a drive sprocket 115 that drives a chain 116 leading to the indexing and clamping means 4. Chain 116 is trained about a sprocket 117 keyed to shaft 75, a sprocket 118 keyed to shaft 111, and a sprocket 119 keyed to shaft 108. An idler sprocket 120 is employed to tension chain 116 about its various sprockets. Accordingly, rotation of drive shaft 27 by drive means 5 causes rotation of shaft 75 in upper platform assembly 60, shaft 108 in lower platform assembly 61, and the shaft 111 of guide roller 110.

Referring ot FIG. 5, shaft 75 of upper platform assembly 60 carries a sprocket 121 keyed thereto at its end opposite sprocket 117. Sprocket 121 serves as a power take-off and drives a chain 122 which is trained around a sprocket 123 keyed to shaft 76. Thus, the two shafts 75 and 76 of platform assembly 60 rotate in unison during operation of the machine. A similar power take-off assembly, illustrated in FIG. 2, is employed in connection with the lower platform assembly 61. In this instance driven shaft 108 carries a sprocket 124 which drives a chain 125 that is trained around a sprocket 126 keyed to shaft 107. Accordingly, the two shafts 107 and 108 of lower platform assembly 61 also rotate in unison when the machine is in operation.

Referring to FIGS. 1 and 2, it may be seen that the drive sprocket 115 (FIG. 1) on drive shaft 27 is in a 1:1 relationship with the driven sprockets 117 and 119 of platform assemblies 60 and 61, respectively. Similarly (FIG. 2), sprockets 121 and 123 of upper platform assembly 16 are in a 1:1 relationship and sprockets 124 and 126 of lower platform assembly 61 are in a 1:1 relationship. Accordingly, each revolution of drive shaft 27 results in a single revolution of shafts 75 and 76 of upper platform assembly 60 and shafts 107 and 108 of lower platform assembly 61.

Referring to FIGS. 4, 6 and 7, the operation of indexing and clamping means 4, and its relationship to the slicing member 10 of slicing means 2, will now be described. The starting point from which this description proceeds will be the instant in time when drive shaft 27 (FIG. 4) rotates the pivot 24 of connecting link 20 to the bottom dead center position of flywheelcrank 26. This moment in time has been depicted in FIG. 6 and it occurs an instant prior to the time when slicing member 10 starts moving upwardly to commence a slicing stroke.

At this point in time, shafts 75, 76, 107 and 108 have rotated the centers of respective cams 73, 74, 105 and 106 inwardly to their closest points of approach to the web W. As a result of this, the indexing plates 72 and 104 of the respective indexing means 69 and 101 are in engagement with the web W, and are moving the web to the right as viewed in FIG. 6. At this time, the clamping plates 66 and 98 of respective clamping means 62 and 95 are out of engagement with the web W.

With the continued rotation of drive shaft 27 (FIG. 4), the pivot 24 of connecting link 20 moves to a 3 o'clock position relative to flywheel-crank 26. This instant in time has been depicted in FIG. 7 and represents the midpoint of the slicing stroke of slicing member 10, at which time blade 10 justs begins to cut into the leading edge of the web W. As illustrated in FIG. 7, shafts 75 and 107 have rotated the centers of their respective cams 73 and 105 to 3 o'clock positions relative to the shafts 75 and 107. At this point in time, control over the web W is in the process of being transferred from the indexing plates 72 and 104 to the clamping plates 66 and 98, and from this time on, web W is stationary and securely clamped adjacent the slicing means 2.

Further rotation of drive shaft 27 (FIG. 4) brings the pivot 24 to the top dead center position of flywheel-crank 26, resulting in the conditions which have been illustrated in FIG. 2 of the drawings. At this point in time, the slicing stroke of slicing member 10 has just been completed and the centers of cams 73, 74, 105 and 106 have been moved to their furthest position away from the web W. Under this condition of operation, the clamping plates 66 and 98 (FIG. 4) are in contact with and securely clamping web W and the indexing plates 72 and 104 are at their furthest point away from the web and moving in an upstream direction preparatory to indexing the web during the next cycle of the machine.

The final point in time to be considered in this description of the operation of indexing and clamping means 4 has been illustrated in FIG. 4. In this condition of operation the pivot 24 is just arriving at the 9 o'clock position relative to flywheel-crank 26. Similarly, the centers of the eccentric cams 73, 74, 105 and 106 are also just arriving at 9 o'clock positions relative to their respective shafts 75, 76, 107 and 108. At this point in time, indexing plates 73 and 104 have just come into contact with the web W and are taking control over the web away from the clamping plates 66 and 98. With continued rotation of drive shaft 27 from this point on, the turning inwardly of the centers of cams 73, 74, 105 and 106 causes the clamping plates 66 and 98 to raise clear of the web W and also causes the indexing plates 72 and 104 to start shifting to the right, as viewed in FIG. 4. This, of course, results in the movement of the leading edge of the web W past the anvil 11 of slicing means 2. The slicing member 10 is at this time moving downwardly on its return stroke, and has already cleared the leading edge of the web W.

From the foregoing, it will be apparent that during each revolution of drive shaft 27 (FIG. 4) a predetermined portion of web W is extended beyond slicing means 2 and severed from the web into a strip S. The strip S, in turn, falls by gravity (with the urging of brush means 6 if necessary) down the slanting surfaces 54 of anvil members 48, onto the inserts 53 thereof.

The rotation of the blades 52 of cutting means 3 is synchronized with the rotation of drive shaft 27 in such a manner that blades 52 are clear of anvil inserts 53 during the time that strip S is falling into place, the sprocket 43 of cutting means 3 being in a 1:1 relationship with the sprocket 45 carried by drive shaft 27. Accordingly, during each revolution of drive shaft 27, the blades 52 proceed through one cutting stroke relative to inserts 53, and this stroke is timed to take place after the strip S has fallen into place on inserts 53.

BRUSH MEANS 6 and 7

The rotary brush means 6 and stationary brush means 7 have been shown generally in FIG. 1, and in greater detail in FIGS. 4 and 8 to 11. As shown in FIGS. 8 to 11, rotary brush means 6 comprises a plurality of thin, disk-shaped brush members 130 which are keyed to a shaft 131 and are axially spaced along shaft 131 by means of spacers 132. A transversely extending channel member 133 is fastened adjacent each of its ends to the spaced support members 42 of cutting means 3 by means of angle members 134 and vertical plates 135, the angle members 134 being welded to the brackets 42, and the vertical spacer plates 135 being welded to channel member 133 and angle members 134. Shaft 131 is journaled in bearings 136 adjacent each of its ends, the shaft being mounted parallel to the cutting edge of slicing member 10. The bearings 136 are carried by plates 137 which are welded to brackets 138, the brackets being bolted to channel member 133.

Brushes 130 are driven by means of a power takeoff mechanism from the shaft 40 (FIG. 10) of rotary cutting means 3. The power take-off mechanism comprises a sprocket 140, which is keyed to shaft 40, a chain 141, a sprocket 142 keyed to the shaft 131 of rotary brush means 6, and an idler sprocket 143 which serves to tension chain 141 about the sprockets 140 and 142. Sprockets 140 and 142 are in a 3:1 relationship so that brushes 130 rotate at a high speed relative to the slicing member 10, which member is wiped by brushes 130 at the end of its slicing stroke. This assures the release of the strips S of tacky material from slicing member 10 at the end of each slicing stroke.

The stationary brush means 7 is also supported by the brackets 42 of cutting means 3. Referring to FIGS. 4 and 8, brush means 7 comprises upper and lower elongated, relatively thin brushes 145 and 146, respectively. Brushes 145 and 146 are fastened at their ends to brackets 147 which, in turn, are affixed to the underside of angle members 134.

As illustrated in FIGS. 4 and 8, brushes 145 and 146 are positioned radially of the shaft 40 of cutting means 3, and are essentially axially coextensive with the shaft. Accordingly, as shaft 40 rotates, the blades 52 of cutting means 3 pass through and are wiped by the brushes 146 and 145. As a result of this, any dice D which may be stuck to the blades 52 are removed from the blades as they pass through the brushes. These dice D then drop onto collector plates 55 and/or conveyor belt C and are removed from the machine.

From the foregoing description, it will be apparent that an improved machine and an improved method for dicing plastic, tacky sheet materials have been provided. The web W is positively controlled in its movement to and through the slicing means 2; the material is securely clamped during both the slicing stroke of slicing means 2 and the cutting stroke of cutting means 3; the slicing stroke of slicing means 2 and the cutting stroke of cutting means 3 are each smooth and relatively shockless; and the tackey material is positively disengaged from the cutting elements of the machine during operation to prevent fouling, the foregoing resulting in the production of highly uniform dice by the machine and method of this invention.

While a particular embodiment of this invention has been shown and described, it will be obvious to those skilled in the art that various changes and modifications may be made without departing from this invention in its broader aspects, and it is, therefore, aimed in the appended claims to cover all such changes and modifications as fall within the true spirit and scope of this invention.

Having thus described my invention, what I claim and desire to protect by Letters Patent is:

1. A method of cutting a longitudinally extending web of sheet material into a plurality of small pieces, comprising: transversely and repeatedly slicing said web to form elongated, narrow strips of said material; and cutting each of said strips at a plurality of points along its length to form said plurality of small pieces, the plurality of cuts in each individual strip being progressively made during a common cutting stroke.

2. A method of cutting a longitudinally extending web of plastic, tacky, sheet material into a plurality of small pieces, comprising: providing a slicing member and a plurality of cutting members; transversely and repeatedly slicing said web with said slicing member to form elongated narrow strips of said material; brushing said slicing member after each slicing stroke to disengage said strips of tacky material from said member; cutting each of said strips at a plurality of points along its length with said cutting members to form said plurality of small pieces, the plurality of cuts in each individual strip being progressively made during a common cutting stroke of said cutting member; and brushing each of said cutting members after each cutting stroke to disengage said small pieces of tacky material from said members.

3. A machine for cutting a web of sheet material into a plurality of small pieces of said material, comprising: slicing means positioned transversely in said machine and operable during successive slicing strokes to sever said web transversely into elongated strips; indexing and clamping means positioned upstream of said slicing means for alternately advancing said web to said slicing means between said slicing strokes and for clamping said web during said slicing strokes; rotary cutting means positioned transversely in said machine and downstream of said slicing means and provided with a plurality of axially spaced blades for severing each of said elongated strips into a plurality of small pieces; driving means; means interconnecting said driving means and with each of said slicing means, indexing and clamping means, and cuting means for cycling each of said means in timed relationship to the other of said means; and respective brush means coextensive with said slicing means and said cutting means and respectively engaged by said slicing means and said cutting means during cycling of said slicing means and cutting means for disengaging cut strips and pieces of said material therefrom.

4. A machine for cutting a web of plastic sheet material into a plurality of small pieces of said material, comprising: a frame; slicing means carried by said frame generally transversely of said web, said slicing means being operable during successive slicing strokes to transversely sever said web into elongated strips of said material; clamping means; and further including eccentric means slicing means for clamping said web during said slicing stroke, said clamping means comprising a pair of opposed platforms adapted to clamp said web therebetween, each of said platforms including a plurality of transversely spaced, longitudinally extending, plate members, the upstream end of one of said platforms and the downstream end of the other of said platforms being pivoted to said frame, and biasing means connected to the downstream end of said one platform and the upstream end of said other platform for urging said two platforms toward one another; indexing means carried by said frame coextensive with said clamping means and operable alternately therewith for advancing said web to said slicing means between said slicing strokes; and rotary cutting means carried by said frame downstream of said slicing means and including a plurality of cooperable blades and anvils for receiving said strips of material and cutting each of said strips into a plurality of small pieces.

5. A machine as described in claim 4 wherein said indexing means comprises a pair of opposed platforms, each of which is formed by a plurality of transversely spaced, longitudinally extending plate members, the plate members of said indexing platforms being positioned alternately with the plate members in the platforms of said clamping means; and further including eccentric means carried by each of said clamping platforms and operative to move each of said indexing platforms for alternately shifting control over said web between said clamping platforms and said indexing platforms.

6. A machine for cutting a web of plastic sheet material into a plurality of small pieces of said material, comprising: a frame; slicing means carried by said frame generally transversely of said web, said slicing means being operable during successive slicing strokes to transversely sever said web into elongated strips of said material; clamping means carried by said frame upstream of said slicing means for clamping said web during said slicing stroke; indexing means carried by said frame coextensive with said clamping means and operable alternately therewith for advancing said web to said slicing means between said slicing strokes; and rotary cutting means carried by said frame downstream of said slicing means and including a plurality of cooperable blades and anvils for receiving said strips of material and cutting each of said strips into a plurality of small pieces, said cutting means comprising a shaft; a plurality of blades keyed to said shaft at axially spaced, rotationally displaced positions along said shaft; a plurality of anvil members carried in a common plane transversely of said frame adjacent said shaft, said anvil members being positioned at a lower level than said slicing means so that said strips of material drop onto said anvil members at the completion of each slicing stroke of said slicing means; and means for rotating said shaft, thereby causing said blades to cut each of said strips of material on said anvils into a plurality of small pieces.

References Cited by the Examiner

UNITED STATES PATENTS

| | | | |
|---|---|---|---|
| 305,709 | 9/1884 | Parry et al. | 83—255 X |
| 705,040 | 7/1902 | Copland | 83—101 X |
| 1,066,577 | 7/1913 | Bertsch | 83—277 |
| 2,676,641 | 4/1954 | George | 83—101 X |
| 2,739,647 | 3/1956 | Coste | 83—355 |
| 2,978,942 | 4/1961 | Re Casino | 83—355 |

FOREIGN PATENTS

| | | |
|---|---|---|
| 103,989 | 5/1938 | Australia. |
| 5,999 | of 1884 | Great Britain. |

References Cited by the Applicant

UNITED STATES PATENTS

| | | |
|---|---|---|
| 927,436 | 7/1909 | Siscoe. |
| 1,897,970 | 2/1933 | Hofmann et al. |
| 2,776,711 | 1/1957 | Bas. |

ANDREW R. JUHASZ, *Primary Examiner.*